(12) United States Patent
Qi et al.

(10) Patent No.: US 7,327,707 B2
(45) Date of Patent: Feb. 5, 2008

(54) PING-PONG AVOIDANCE LOAD BALANCING TECHNIQUES AND STRUCTURES FOR WIRELESS COMMUNICATION

(75) Inventors: Emily H. Qi, Portland, OR (US); Kaustubh Das, Hillsboro, OR (US); Michael B. Andrews, Beaverton, OR (US); Omesh Tickoo, Troy, NY (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 10/844,743

(22) Filed: May 12, 2004

(65) Prior Publication Data

US 2005/0265283 A1 Dec. 1, 2005

(51) Int. Cl.
*H04Q 7/00* (2006.01)

(52) U.S. Cl. .................. 370/331; 455/443; 455/440; 455/436

(58) Field of Classification Search ............... 370/331, 370/328, 338; 455/436–444, 453
See application file for complete search history.

(56) References Cited

U.S. PATENT DOCUMENTS

| | | | |
|---|---|---|---|
| 5,999,814 A * | 12/1999 | Cuffaro et al. ............... 455/436 |
| 6,327,472 B1 * | 12/2001 | Westroos et al. ............. 455/450 |
| 2002/0061750 A1 * | 5/2002 | Mohebbi ..................... 455/437 |

* cited by examiner

*Primary Examiner*—George Eng
*Assistant Examiner*—Marcos L. Torres
(74) *Attorney, Agent, or Firm*—The Law Offices of John C. Scott, LLC; John C. Scott

(57) ABSTRACT

Techniques and structures for performing load balancing in a wireless network in a manner that prevents the occurrence of ping pong are disclosed.

44 Claims, 4 Drawing Sheets

PING-PONG AVOIDANCE LOAD BALANCING TECHNIQUES AND STRUCTURES FOR WIRELESS COMMUNICATION

TECHNICAL FIELD

The invention relates generally to wireless communication and, more particularly, to techniques and structures for performing load balancing in a wireless system.

DETAILED DESCRIPTION

Figure 1:
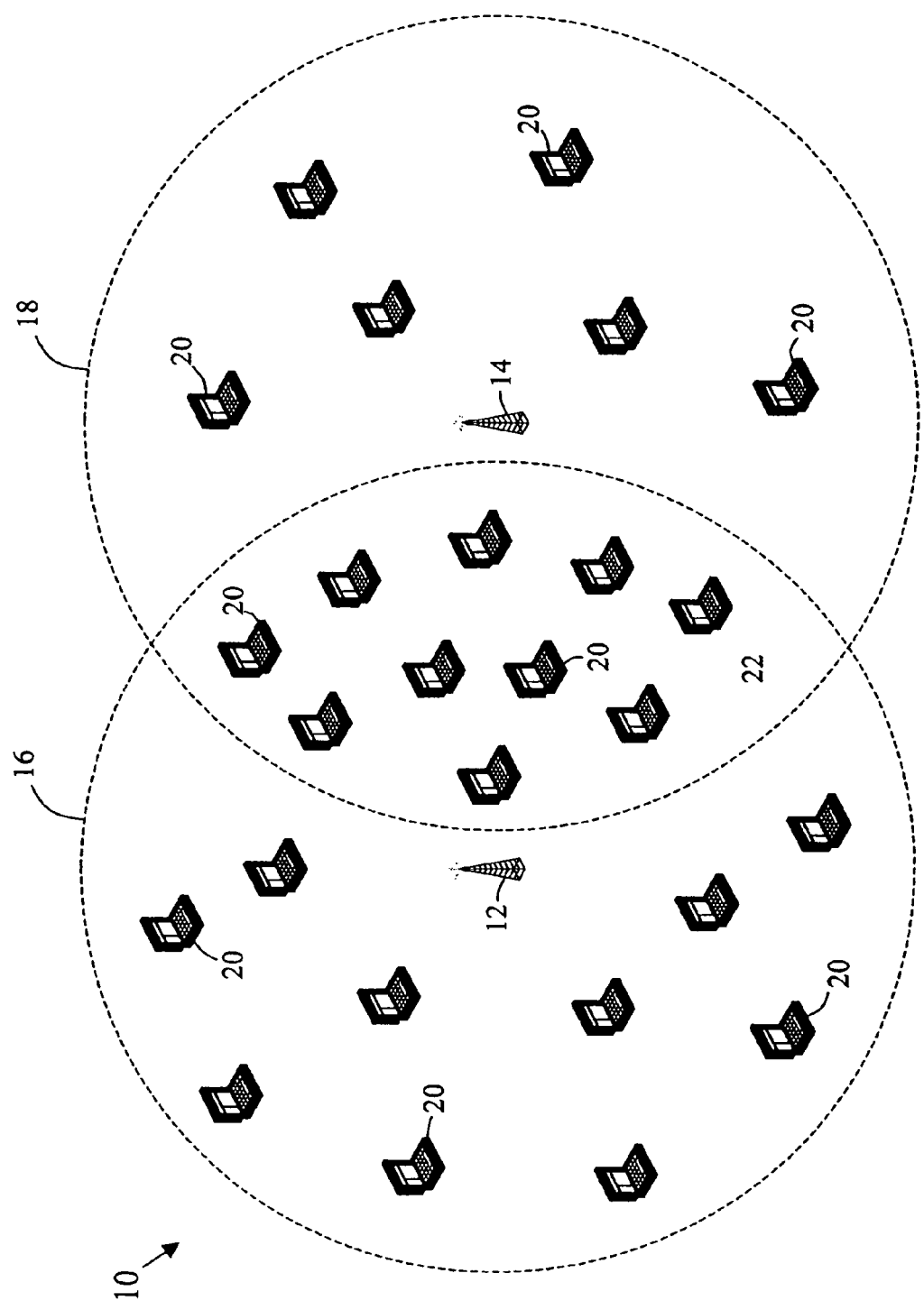
FIG. 1 is a diagram illustrating an example wireless network arrangement that may implement features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example wireless network arrangement 10 that may implement features of the present invention. As shown, the wireless network arrangement 10 includes a first wireless access point (AP) 12 to provide wireless access to a network for users within a first coverage area 16 and a second wireless access point (AP) 14 to provide wireless access to the network for users within a second coverage area 18. A number of wireless user devices 20 are located within the first and second coverage areas 16, 18. The wireless user devices 20 may include any type of device that allows a user to wirelessly access a network including, for example, a laptop, desktop, palmtop, or tablet computer having wireless networking capability, a personal digital assistant (PDA) having wireless networking capability, a cellular telephone or other handheld communicator, a pager, and/or others. In a network following the IEEE 802.11 wireless networking standard (ANSI/IEEE Std 802.11-1999 Edition and progeny), wireless user devices are referred to as "stations" or STAs and the wireless AP and its associated stations are referred to as a "basic service set" or BSS. In other wireless standards, other terminology may be used. Features of the present invention may be implemented in systems following any wireless networking or cellular standard.

As shown in FIG. 1, the first and second coverage areas 16, 18 overlap one another. This overlapping of coverage areas may be implemented to, for example, ensure a given level of performance within the network. The overlapping coverage areas 16, 18 define an overlap region 22 that may include some devices that are associated with the first wireless AP 12 and some devices that are associated with the second wireless AP 14. A wireless user device may receive information periodically from various APs in a surrounding environment (e.g., beacon frames in an IEEE 802.11 based network, etc.) that allows the wireless user device to make a decision about which AP to associate with. The wireless user device may, for example, measure a received signal strength of each of the received signals and decide to switch (i.e., handoff) to the AP having the highest received signal strength. In another possible approach, a wireless user device may use information about the present traffic load of the various APs, in addition to the signal strength information, to make a handoff decision. It is typically desirable to achieve a balance in load levels between the various APs within a network. However, some load balancing techniques may create other problems that need to be dealt with. For example, with reference to FIG. 1, if some or all of the wireless user devices 20 within the overlap region 22 follow the same process for choosing an AP, a situation may arise where a number of devices change their association concurrently (e.g., from AP 12 to AP 14, etc.). Thus, a condition where the first AP 12 is heavily loaded and the second AP 14 is lightly loaded may quickly turn into a situation where the second AP 14 is heavily loaded and the first AP 12 is lightly loaded. In response to this new situation, a number of user devices 20 associated with the second AP 14 may switch back to the first AP 12, thus reversing the load imbalance once again. This may occur repeatedly. Such a series of occurrences is known as a ping pong situation. In at least one aspect of the present invention, techniques and structures are provided that are capable of reducing or eliminating the occurrence of ping pong during load balancing in a wireless network.

Figure 2:
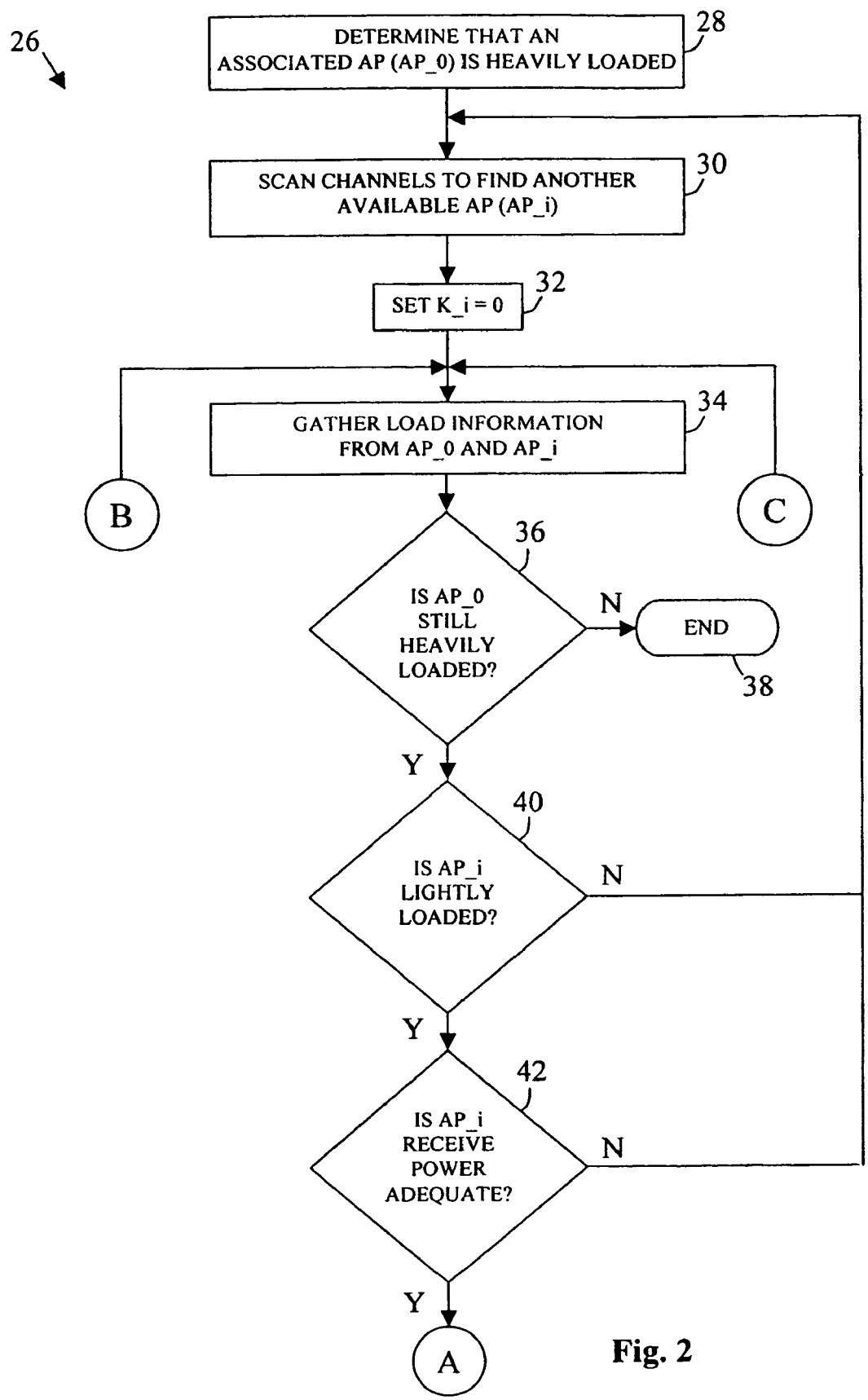
FIGS. 2 and 3 are portions of a flowchart illustrating an example method for use in providing load balancing in a wireless network in accordance with an embodiment of the present invention.
Figure 3:
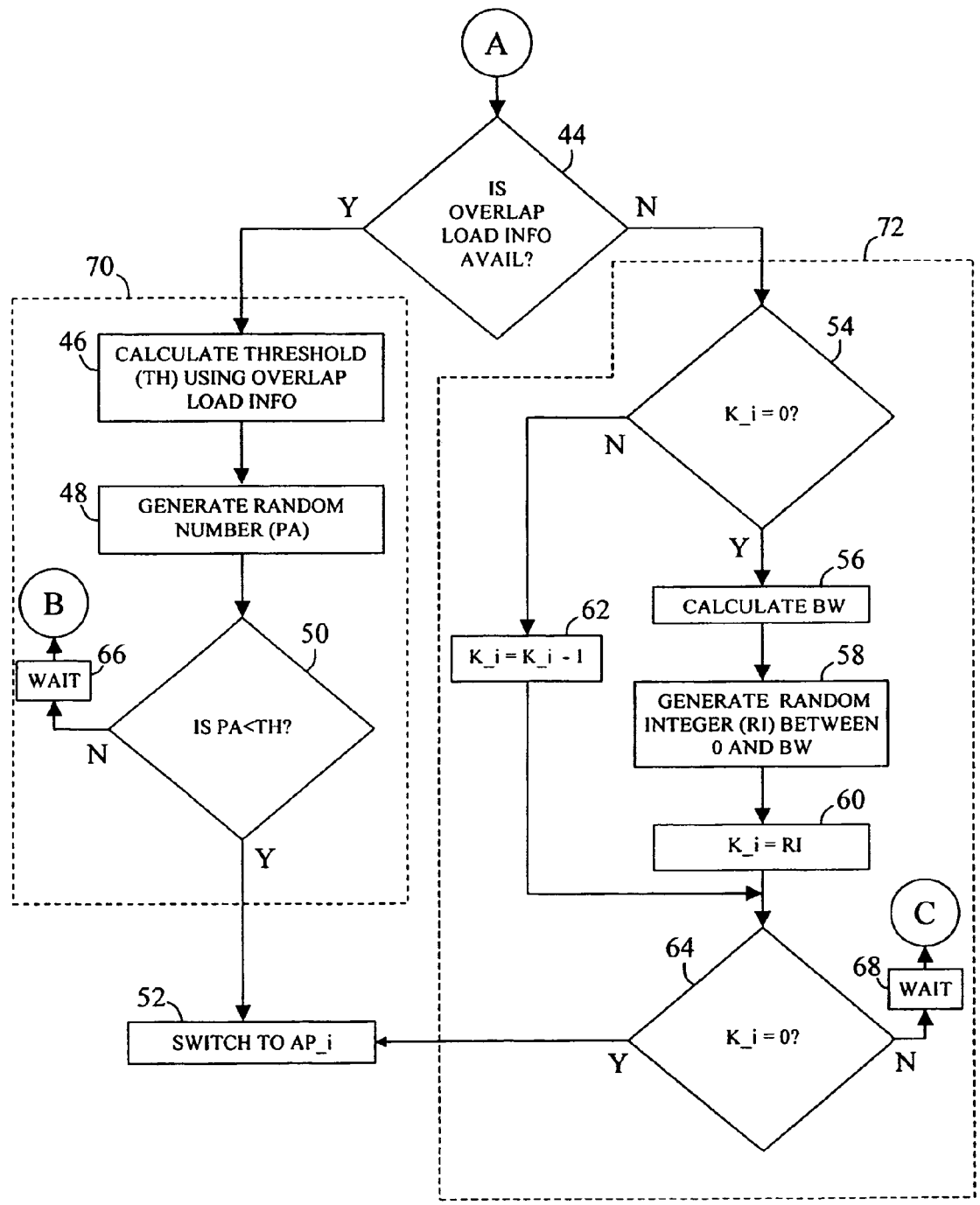

FIGS. 2 and 3 are portions of a flowchart illustrating an example method 26 for use in providing load balancing in a wireless network in accordance with an embodiment of the present invention. A wireless user device first determines that an access point that it is presently associated with (AP_0) is heavily loaded (block 28). The user device may determine this based on, for example, load information received from AP_0. The load information may, for example, be received by the user device as part of a periodic transmission of AP_0 (e.g., a beacon, etc.) or the user device may request the information from AP_0 through the management frames, or the user device may collect it locally by sensing clear channel. The load information may be any type of information that can be used to determine a current load condition of AP_0 (e.g., a number of user devices currently associated with AP_0, a channel-busy fraction associated with AP_0 (indicating, for example, a percentage of time that a corresponding wireless channel is busy), a traffic load indicator for AP_0, and/or others, including combinations of the above). To determine that AP_0 is heavily loaded, the load information that is obtained for AP_0 may, for example, be compared to a threshold value. Other techniques may alternatively be used.

After it is determined that the associated access point (AP_0) is heavily loaded, the user device may scan a number of channels to find another available access point (AP_i) in the vicinity (block 30). If multiple other APs are identified during scanning, one of them may be selected for initial consideration based on some selection criterion (e.g., highest receive power level, etc.), although this is not necessary. When another AP has been identified, a corresponding backoff count K_i may be initialized to zero (or some other value) (block 32). Load information may then be gathered from AP_0 and AP_i (block 34). It may be determined at this point if AP_0 is still heavily loaded (block 36). If not, the method 26 may terminate (block 38). If AP_0 is still heavily loaded, it may then be determined whether AP_i (the discovered access point) is lightly loaded (block 40). In one possible approach, the determination of whether AP_i is lightly loaded is made based on a comparison of the loads of AP_i and AP_0. For example, in at least one implementation, it is determined whether the difference between the load of AP_0 and the load of AP_i is greater than a threshold load level. This may be expressed as follows:

$$L\_0 - L\_i > L\_th$$

where L_0 represents the load associated with AP_0, L_i represents the load associated with AP_i, and L_th is the load threshold. Other techniques for determining whether AP_i is lightly loaded may alternatively be used (e.g., comparison of L_i with a threshold directly, etc.).

If AP_i is not lightly loaded, the method 26 may, for example, return to block 30 and scan the channels again to attempt to find another available AP in the vicinity (i.e., AP_i is not considered to be a good candidate for handoff because it is too highly loaded). If AP_i is lightly loaded, on the other hand, it may then be determined whether the received signal strength associated with AP_i (i.e., the strength of the signal received within the wireless user device from AP_i) is adequate (block 42). In one possible approach, this determination is made by comparing the received signal strength of AP_i with the received signal strength of AP_0. For example, in at least one implementation, the following relationship is used to determine whether the received signal strength of AP_i is adequate:

$$S\_i - S\_0 > -S\_th$$

where S_i represents the received signal strength associated with AP_i, S_0 represents the received signal strength associated with AP_0, and S_th represents a signal strength threshold. In another possible approach, the received signal strength associated with AP_i is simply compared directly with a threshold value (e.g., S_i>S_th). Other techniques may alternatively be used.

If the received signal strength of AP_i is determined to be inadequate, the method 26 may, for example, return to block 30 and scan the channels again to attempt to find another available AP in the vicinity (i.e., AP_i is not considered to be a good candidate for handoff because its signal is too weak). If the received signal strength of AP_i is determined to be adequate, on the other hand, it may next be determined whether any aggregated load information is available for AP_0 for the overlap region between AP_0 and AP_i (block 44—FIG. 3). The aggregated load for the overlap region is the portion of the load of AP_0 that is associated with users in the overlap region (e.g., see overlap region 22 of FIG. 1). The aggregated load for the overlap region may be indicated in the same fashion as the corresponding load of AP_0. For example, in an implementation where the load of AP_0 is indicated as the number of users currently associated with AP_0, the aggregated load information for the overlap region may be indicated as the number of users associated with AP_0 that are currently within the overlap region. Other measures may alternatively be used.

As shown in FIG. 3, if overlap load information is available, then a first backoff procedure 70 may be followed to reduce or prevent the occurrence of ping pong within the network. Likewise, if overlap load information is not available, then a second backoff procedure 72 may be followed to reduce or prevent the occurrence of ping pong within the network. These two backoff procedures 70, 72 will be discussed separately. If overlap load information is available, this information may be used to calculate a threshold (TH) that may be related to a probability that the corresponding user device will handoff to AP_i (block 46). In at least one embodiment, the threshold TH is made inversely proportional to the load of the overlap region. For example, in one approach, the threshold (TH) may be calculated as follows:

$$TH = \frac{L\_0 - L\_i}{2L\_0i} * (100) \qquad \text{(Equation 1)}$$

where L_0i is the aggregated load for AP_0 for the overlap region associated with AP_0 and AP_i. The above expression for the threshold TH was developed as follows. First it was assumed that a load L had to be moved from AP_0 (having load L_0) to AP_i (having load L_i) for a balanced load condition to be achieved. This results in the following relationship:

$$L\_0 - L = L\_i + L$$

It then follows that:

$$L = (L\_0 - L\_i)/2$$

so that (L_0−L_i)/2 of load should be moved from AP_0 to AP_i to achieve a balanced condition. If (L_0−L_i)/2 is larger than the aggregated load L_0i in the overlap region, then all of the relevant user devices should be moved to AP_i immediately. If (L_0−L_i)/2=0, then no user devices should be moved. If (L_0−L_i)/2 is smaller than L_0i, but not zero, then some of the user devices in the overlap region may be moved and others should remain. If (L_0−L_i)/2 is smaller than L_0i, but close to L_0i, then more user devices should be moved to AP_i. If (L_0−L_i)/2 is much smaller than L_0i, then fewer user devices should be moved to AP_i. The threshold expression of Equation 1 is one possible technique for achieving the above relationships. Other techniques for calculating a threshold TH may alternatively be used.

A random number (PA) is next generated for comparison with the threshold (TH) (block 48). The range that the random number will be permitted to take will typically depend upon the technique used to generate the threshold. If Equation 1 above is used, for example, then a random number may be generated between 0 and 100. It is next determined whether the random number (PA) is less than the threshold (TH) (block 50). If PA is not less than TH, then the method 26 may wait a predetermined time period (block 66) and then return to block 34 to again collect load information from AP_0 and AP_i (see FIG. 2). In this manner, the wireless user device will "back off" and will not switch to AP_i at this time. If PA is less than TH, on the other hand, the wireless user device may immediately switch its association to AP_i (block 52).

As described previously, in at least one embodiment of the invention, the threshold TH is calculated using Equation 1 above. The use of Equation 1 in a number of different operational scenarios will now be described. The discussion that follows will be made with reference to FIG. 1 with access point 12 treated as AP_0 and access point 14 treated as AP_1. The load of an AP will be taken as the number of users associated with the AP. In a first scenario, assume that AP_0 has 20 associated user devices within coverage area 16 and AP_1 has 6 associated user devices within coverage area 18. Also assume that 10 of the user devices associated with AP_0 are located within the overlap region 22 and none of the user devices associated with AP_1 are located within the overlap region 22. In this scenario, TH will be calculated as follows:

$$TH = \frac{20-6}{2*10} *(100) = 70$$

Thus, if a random number PA between 0 and 100 is generated, there will be a 70% chance that a wireless user device associated with AP_0 and within the overlap region 22 will switch to AP_1. If each of the wireless user devices within the overlap region follows the above-described backoff procedure, statistically, about 7 out of the 10 devices in the overlap region 22 will switch to AP_1. This will result in 13 user devices being associated with AP_0 and 13 user devices being associated with AP_1 (i.e., a balanced situation). In another possible scenario, if AP_0 and AP_1 each have the same number of user devices associated with them, then TH will be zero and none of the user devices associated with AP_0 will be switched to AP_1 (the loads are already balanced). In yet another scenario, if AP_0 has 20 user devices within coverage area 16, with 10 of these in the overlap region 22, and AP_1 has no user devices within coverage area 18, then TH will be calculated as follows:

$$TH = \frac{20-0}{2*10} *(100) = 100$$

Thus, there will be a 100% chance that a wireless user device associated with AP_0 and within the overlap region 22 will switch to AP_1. Similar results will be achieved using other load measures.

Returning now to FIG. 3, the second backoff procedure 72 may be used when overlap load information is not available. The second procedure 72 uses a countdown backoff counter approach to reduce or prevent the occurrence of ping pong in the network. Once it is determined that overlap load information is not available (block 44), it is then determined whether this is the first time through the backoff procedure 72 for AP_i (block 54). As illustrated, this can be accomplished by determining whether the backoff count K_i is presently zero (as initialized in block 32 of FIG. 2). If it is the first time, a random integer upper limit (BW) is calculated based on current load conditions within the network (block 56). A random integer (RI) that does not exceed the upper limit BW (e.g., $0 \leq RI \leq BW$) is then generated (block 58). The backoff count K_i is then set to the value of the random integer RI (block 60). As will be described in greater detail, the backoff count K_i may subsequently be used to delay a switch to AP_i for the user device of interest.

After the backoff count K_i is set to the value of the random integer, it is next determined whether the value of K_i is currently zero (or some other predetermined value) (block 64). If the value is zero, the user device may immediately switch to AP_i (block 52). If the value of K_i is not zero, then the method 26 may wait a predetermined time period (block 68) and then return to block 34 (see FIG. 2) to again collect load information from AP_0 and AP_i. It may then be determined whether AP_0 is still heavily loaded (block 36). If AP_0 is not heavily loaded at this point, the method 26 may terminate (block 38). If AP_0 is still heavily loaded, it may then again be determined whether AP_i is lightly loaded (block 40). If not, the method 26 may return to block 30 and the channels will be scanned for another AP. If AP_i is lightly loaded, it will again be determined whether the receive signal strength associated with AP_i is adequate (block 42). If not, the method 26 may return to block 30 and the channels will be scanned for another AP. If the received signal strength is adequate, it will again be determined whether overlap load information is available (block 44).

If it is determined that overlap load information is still not available, it will next be determined whether the backoff count K_i is zero (block 54). At this time, the backoff count will not be zero. Thus, the backoff count K_i will be decremented by 1 (block 62). It will then again be determined whether the backoff count K_i is zero (block 64). If K_i is zero at this time, the user device may immediately switch to AP_i (block 52). If K_i is not zero, the above described process will repeat until the backoff count reaches zero (and the user device switches to AP_i) or AP_0 is no longer heavily loaded or AP_i is no longer lightly loaded or the receive signal strength of AP_i is no longer adequate or overlap load information becomes available. As described previously, if AP_i is no longer lightly loaded or the receive signal strength of AP_i is no longer adequate, the method may return to block 30 and another AP may be found (i.e., AP_i may no longer be considered a good candidate for handoff). The method 26 may then be repeated for the newly discovered AP. If overlap load information becomes available during the backoff procedure, then the method 26 may switch to first procedure 70.

In one possible approach, the random integer upper limit (BW) is calculated as a linear combination of the difference between the loads of AP_0 and AP_i and the traffic load of the subject wireless user device (i.e., T_a). In one implementation, for example, the upper limit BW may be calculated as follows:

$$BW = \frac{C}{(L\_0 - L\_i)*T\_a} \quad \text{(Equation 2)}$$

where C is a constant. Based on the above, the upper limit BW will decrease as the traffic load of the user device increases, thus giving a higher switching priority to more heavily loaded devices. Also, the upper limit BW will decrease as the difference between the loads of AP_0 and AP_i (i.e., L_0−L_i) increases, thus allowing more wireless user devices to be moved to AP_i when the difference between the loads is large. As will be appreciated, other techniques for calculating BW may alternatively be used.

In the method 26 of FIGS. 2 and 3, either the first procedure 70 or the second procedure 72 is performed based on whether or not overlap load information is available (block 44 in FIG. 3). In some other embodiments, only one of the two procedures 70, 72 is used as part of a load balancing method. For example, in at least one embodiment, only the second procedure 72 is used (i.e., block 44 and procedure 70 may be removed). In other embodiments, only the first procedure 70 is used (i.e., blocks 32 and 44 and procedure 72 may be removed). Other modifications and variations to the method 26 may also be made.

Figure 4:
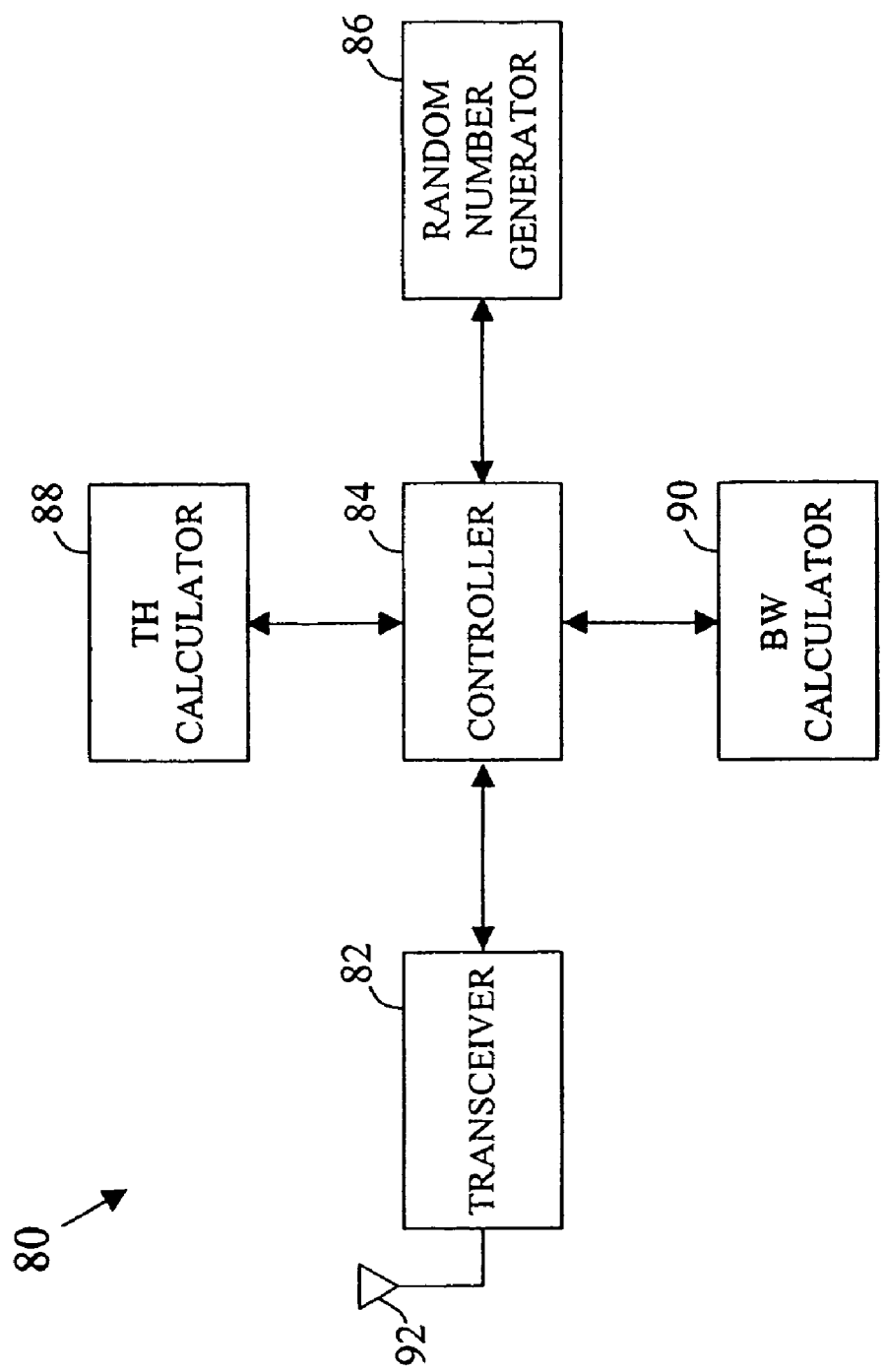
FIG. 4 is a block diagram illustrating an example wireless user device in accordance with an embodiment of the present invention.

FIG. 4 is a block diagram illustrating an example wireless user device 80 in accordance with an embodiment of the present invention. As illustrated, the wireless user device 80 may include one or more of: a wireless transceiver 82, a controller 84, a random number generator 86, a TH calculator 88, a BW calculator 90, and an antenna 92. The controller 84 may control the operation of the user device 80 (or a portion thereof). The controller functions may be implemented within, for example, one or more digital processing devices within the user device 80 (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above). The wireless transceiver 82 is operative for supporting wireless communication with one or more remote wireless entities (e.g., a wireless AP, another wireless device, etc.). In at least one embodiment, the wireless transceiver 82 may be configured in accordance with one or more wireless standards (e.g., IEEE 802.11, etc.). The wireless transceiver 82 may be coupled to one or more antennas 92 to facilitate the transmission and reception of wireless signals. Any type of antenna(s) may be used including, for example, a dipole antenna, a patch antenna, a helical antenna, an antenna array, and/or others.

In at least one embodiment of the present invention, the controller 84 may be programmed to perform, among other things, load balancing functions in a wireless network in a manner that avoids the occurrence of a ping pong situation. For example, the controller 84 may receive information (e.g., a beacon signal, etc.) via wireless transceiver 82 indicating that a wireless AP currently associated with the wireless user device 80 is heavily loaded. The controller 84 may then initiate actions to attempt to switch to another AP in the vicinity that is less heavily loaded. For example, the controller 84 may scan a number of channels to first determine whether there is another AP in the vicinity. If another AP is discovered, the controller 84 may check to determine whether the AP is a good candidate for handoff. For example, the controller 84 may check to see whether the discovered AP is more lightly loaded than the presently associated AP. The controller 84 may also check to determine whether the received signal strength associated with the discovered AP is adequate. If neither of these are true, the controller 84 may scan for another AP.

In at least one implementation, the controller 84 may be programmed to use a backoff count approach to determine whether to switch to another AP when an associated AP is found to be heavily loaded. For example, the controller 84 may consult the BW calculator 90 to calculate a random integer upper limit (BW) based on current load conditions in the network. In at least one embodiment, the BW calculator 90 uses Equation 2 set out above to calculate the random number upper limit (although other techniques may alternatively be used). The random number generator 86 may then be used to generate a random integer between 0 and BW to be used as a backoff count for the device 80. The controller 84 may then repeatedly check to determine whether the newly discovered AP is still a good candidate for handoff, while decrementing the randomly generated backoff count for each repetition. If the backoff count reaches zero (or some other predetermined value) while the newly discovered AP is still a good candidate for backoff, then the wireless user device 80 may switch its association to the new AP.

In another possible implementation, the controller 84 may use a threshold approach to determine whether to switch to another AP when an associated AP is found to be heavily loaded. This approach requires the availability of aggregated load information of the associated AP for the overlap region between the associated AP and the discovered AP. After another AP has been discovered and found to be a good candidate for handoff, the controller 84 may consult the TH calculator 88 to calculate a threshold TH using load information of the associated AP and the discovered AP as well as the aggregated load information for the overlap region between the associated AP and the discovered AP. In at least one embodiment, the TH calculator 88 uses Equation 1 set out above to calculate the threshold TH (although other techniques may alternatively be used). The controller 84 may then use the random number generator 86 to generate a random number that is then compared to the threshold (TH) to determine whether or not to switch to the other AP. If the wireless user device 80 does not switch to the new AP as a result of the comparison, the controller 84 may return and recheck whether the new AP is still a good candidate for handoff and, if so, generate another threshold TH and perform the comparison again. This may be repeated until either a switch to the new AP is made or the new AP is no longer a good candidate for handoff. In at least one embodiment, the wireless user device 80 maybe programmed to perform both the backoff count approach and the threshold approach described above. The approach that is used at any particular time may depend upon the availability of aggregated load information for the overlap region between the associated AP and the discovered AP. In other embodiments, the wireless user device 80 maybe programmed to use only the backoff count approach or only the threshold approach (in which case either the TH calculator 88 or the BW calculator 90 may not be provided). In at least one implementation, the wireless transceiver 82, the controller 84, the random number generator 86, and the TH calculator 88 and/or BW calculator 90 are implemented as part of a wireless network interface card (NIC) or other network interface module.

In the embodiments described above, features of the invention have been described, for the most part, in the context of infrastructure networks where wireless user devices communicate through a corresponding wireless access point. It should be appreciated that the invention also has application in ad-hoc networks in which wireless user devices may communicate with one another via direct wireless links. In an ad-hoc network, a first wireless user device may need to select another wireless user device to communicate through in the network. Features of the invention may be used to select a wireless user device to communicate through in a manner that both balances loads in the ad hoc network and that prevents or reduces the occurrence of ping pong in the network.

The techniques and structures of the present invention may be implemented in any of a variety of different forms. For example, features of the invention may be embodied within portable computers, PDAs, cellular telephones and other mobile communicators, pagers, network interface cards (NICs) and other network interface structures, integrated circuits, as instructions stored on machine readable media, and/or in other formats. Examples of different types of machine readable media that may be used include floppy diskettes, hard disks, optical disks, CD-ROMs, magneto-optical disks, ROMs, RAMs, EPROMs, EEPROMs, magnetic or optical cards, flash memory, and/or other types of media suitable for storing electronic instructions. In at least one implementation, features of the invention are embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one embodiment, two or more of the blocks of a block diagram are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in managing handoffs in a wireless user device, comprising:
    calculating a threshold using: load information for a first wireless access point having a first coverage area, load information for a second wireless access point having a second coverage area, and load information for said first wireless access point for an overlap region of said first and second coverage areas;
    generating a random number; and
    determining whether to switch association from said first wireless access point to said second wireless access point based on a comparison of said random number and said threshold.

2. The method of claim 1, wherein:
    calculating a threshold includes calculating a difference between a load of said first wireless access point and a load of said second wireless access point.

3. The method of claim 1, wherein:
    calculating a threshold includes evaluating the following equation:

$$TH = \frac{L\_0 - L\_i}{2L\_0i} * (100)$$

where L_0 represents the load of said first wireless access point, L_i represents the load of said second wireless access point, and L_0i represents the load of said first wireless access point for said overlap region.

4. The method of claim 3, wherein:
    generating a random number includes generating a random number between 0 and 100.

5. The method of claim 1, further comprising:
    determining that said second wireless access point is a good candidate for handoff before calculating said threshold.

6. The method of claim 5, wherein:
    determining that said second wireless access point is a good candidate for handoff includes determining that said second wireless access point is lightly loaded.

7. The method of claim 5, wherein:
    determining that said second wireless access point is a good candidate for handoff includes determining that a receive signal strength associated with said second wireless access point is adequate.

8. The method of claim 1, wherein:
    determining whether to switch association includes determining that a switch is to be made when said random number is less than said threshold.

9. The method of claim 8, further comprising:
    checking whether said second wireless access point is still a good candidate for handoff when said random number is not less than said threshold.

10. The method of claim 9, further comprising:
    when checking indicates that said second wireless access point is still a good candidate for handoff, calculating a new threshold, generating a new random number, and determining whether to switch association from said first wireless access point to said second wireless access point based on a comparison of said new random number and said new threshold.

11. A method for use in managing handoffs in a wireless user device, comprising:
    calculating an upper limit using load information for a first wireless access point and load information for a second wireless access point;
    generating a random integer that does not exceed said upper limit;
    setting a backoff count equal to said random integer; and
    determining whether to switch association from said first wireless access point to said second wireless access point based on a comparison of said backoff count and a predetermined value.

12. The method of claim 11, wherein:
    determining whether to switch association includes determining to switch from said first wireless access point to said second wireless access point when said backoff count equals said predetermined value.

13. The method of claim 12, further comprising:
    when said backoff count does not equal said predetermined value:
        determining whether said second wireless access point is still a good candidate for handoff; and
        when said second wireless access point is still be a good candidate for handoff:
            decrementing said backoff count; and
            repeating determining whether to switch association.

14. The method of claim 13, further comprising:
    when said second wireless access point is not still a good candidate for handoff, scanning channels to find another available access point.

15. The method of claim 13, further comprising:
    when said second wireless access point is not still a good candidate for handoff, initializing said backoff count.

16. The method of claim 11, wherein:
said predetermined value equals zero.

17. The method of claim 11, wherein:
generating a random integer includes generating a random integer that is between zero and said upper limit.

18. The method of claim 11, wherein:
said upper limit is inversely proportional to a difference between a load of said first wireless access point and a load of said second wireless access point.

19. The method of claim 11, wherein:
calculating includes calculating said upper limit using traffic load information for the wireless user device.

20. The method of claim 19, wherein:
said upper limit is inversely proportional to a traffic load of said wireless user device.

21. A method for use in managing handoffs in a wireless user device, comprising:
determining that an associated wireless access point is heavily loaded, said associated wireless access point having a first coverage area;
finding another wireless access point, said another wireless access point having a second coverage area;
determining whether said another wireless access point is a good candidate for handoff;
when said another wireless access point is a good candidate for handoff, determining whether overlap load information is available for said associated wireless access point for an overlap region of said first and second coverage areas;
when overlap load information is available, using said overlap load information to make a handoff decision; and
when overlap load information is not available, using wireless user device traffic information to make a handoff decision;
wherein using said overlap load information to make a handoff decision includes:
calculating a threshold using load information for said associated wireless access point, load information for said another wireless access point, and said overlap load information;
generating a random number; and
determining whether to switch association from said associated wireless access point to said another wireless access point based on a comparison of said random number and said threshold.

22. The method of claim 21, wherein using wireless user device traffic information to make a handoff decision includes:
calculating an upper limit based on load information for said presently associated wireless access point, load information for said another wireless access point, and said wireless user device traffic information;
generating a random integer that does not exceed said upper limit;
setting a backoff count equal to said random integer; and
determining whether to switch association from said associated wireless access point to said another wireless access point based on a comparison of said backoff count and a predetermined value.

23. The method of claim 21, wherein:
determining whether said another wireless access point is a good candidate for handoff includes determining whether said another wireless access point is lightly loaded.

24. The method of claim 21, wherein:
determining whether said another wireless access point is a good candidate for handoff includes determining whether a receive signal strength associated with said another wireless access point is adequate.

25. An apparatus comprising:
a wireless transceiver to support wireless communication with a remote wireless entity;
a controller;
a random number generator to generate random numbers; and
a threshold calculator to calculate a threshold for use in making an access point handoff decision;
wherein said controller is programmed to: instruct said threshold calculator to calculate a threshold, instruct said random number generator to generate a random number, and determine whether to handoff from a first wireless access point to a second wireless access point based on a comparison of said random number and said threshold.

26. The apparatus of claim 25, wherein:
said first wireless access point has a first coverage area and said second wireless access point has a second coverage area; and
said threshold calculator is operative to calculate said threshold using load information for said first wireless access point, load information for said second wireless access point, and overlap load information for said first wireless access point for an overlap region of said first and second coverage areas.

27. The apparatus of claim 25, further comprising:
an upper limit calculator to calculate an upper limit for a random integer for use in making an access point handoff decision.

28. The apparatus of claim 27, wherein:
said upper limit calculator is operative to calculate said upper limit using load information for said first wireless access point, load information for said second wireless access point, and wireless user device traffic information.

29. The apparatus of claim 27, wherein:
said controller is programmed to: instruct said upper limit calculator to calculate an upper limit for a random integer, instruct said random number generator to generate a random integer that does not exceed said upper limit, set a backoff count equal to said random integer, and determine whether to handoff from said first wireless access point to said second wireless access point based on a comparison of said backoff count and a predetermined value.

30. The apparatus of claim 27, wherein:
said controller is programmed to use said threshold calculator to make an access point handoff decision when overlap load information is available and to use said upper limit calculator to make an access point handoff decision when overlap load information is not available.

31. The apparatus of claim 25, wherein:
said apparatus is a wireless network interface module.

32. An apparatus comprising:
a wireless transceiver to support wireless communication with a remote wireless entity;
a controller;
a random number generator to generate random numbers; and an upper limit calculator to calculate an upper limit for a random integer for use in making an access point handoff decision;

wherein said controller is programmed to: instruct said upper limit calculator to calculate an upper limit for a random integer, instruct said random number generator to generate a random integer that does not exceed said upper limit, set a backoff count equal to said random integer, and determine whether to handoff from a first wireless access point to a second wireless access point based on a comparison of said backoff count and a predetermined value.

33. The apparatus of claim 32, wherein:

said controller is programmed to repeatedly recheck a status of said second wireless access point and repeatedly decrement said backoff count until said backoff count is equal to said predetermined value or said second access point is no longer a good candidate for handoff.

34. The apparatus of claim 32, wherein:

said upper limit calculator is operative to calculate said upper limit using load information for said first wireless access point, load information for said second wireless access point, and wireless user device traffic information.

35. A wireless user device comprising:

at least one dipole antenna; a wireless transceiver, coupled to said at least one dipole antenna, to support wireless communication with a remote wireless entity;

a controller;

a random number generator to generate random numbers; and a threshold calculator to calculate a threshold for use in making an access point handoff decision;

wherein said controller is programmed to: instruct said threshold calculator to calculate a threshold, instruct said random number generator to generate a random number, and determine whether to handoff from a first wireless access point to a second wireless access point based on a comparison of said random number and said threshold.

36. The wireless user device of claim 35, wherein:

said first wireless access point has a first coverage area and said second wireless access point has a second coverage area; and said threshold calculator is operative to calculate said threshold using load information for said first wireless access point, load information for said second wireless access point, and overlap load information for said first wireless access point for an overlap region of said first and second coverage areas.

37. The wireless user device of claim 35, further comprising:

a random integer upper limit calculator to calculate an upper limit for a random integer for use in making an access point handoff decision.

38. The wireless user device of claim 37, wherein:

said controller is programmed to use said threshold calculator to make an access point handoff decision when overlap load information is available and to use said random integer upper limit calculator to make an access point handoff decision when overlap load information is not available.

39. An article comprising a computer readable storage medium having instructions stored thereon that, when executed by a computing platform, operate to:

calculate a threshold using: load information for a first wireless access point having a first coverage area, load information for a second wireless access point having a second coverage area, and load information for said first wireless access point for an overlap region of said first and second coverage areas;

generate a random number; and determine, for a first wireless user device, whether to switch association from said first wireless access point to said second wireless access point based on a comparison of said random number and said threshold.

40. The article of claim 39, wherein:

to calculate a threshold includes to evaluate the following equation:

$$TH = \frac{L\_0 - L\_i}{2L\_0i} * (100)$$

where $L\_0$ represents the load of said first wireless access point, $L\_i$ represents the load of said second wireless access point, and $L\_0i$ represents the load of said first wireless access point for said overlap region.

41. The article of claim 40, wherein:

to generate a random number includes to generate a random number between 0 and 100.

42. An article comprising a computer readable storage medium having instructions stored thereon that, when executed by a computing platform, operate to:

calculate an upper limit using load information for a first wireless access point and load information for a second wireless access point;

generate a random integer that does not exceed said upper limit;

set a backoff count equal to said random integer; and determine, for a first wireless user device, whether to switch association from said first wireless access point to said second wireless access point based on a comparison of said backoff count and a predetermined value.

43. The article of claim 42, wherein:

to determine whether to switch association includes to determine to switch from said first wireless access point to said second wireless access point when said backoff count equals said predetermined value.

44. The article of claim 43, wherein said instructions, when executed by said computing platform, further operate to:

when said backoff count does not equal said predetermined value:

determining whether said second wireless access point is still a good candidate for handoff; and when said second wireless access point is still be a good candidate for handoff:

decrementing said backoff count; and repeating determining whether to switch association.

* * * * *